Jan. 31, 1956  E. S. GREENE  2,732,587
MASTICATING HEAD FOR AN EXTRUSION MACHINE
Filed March 23, 1953  2 Sheets-Sheet 1
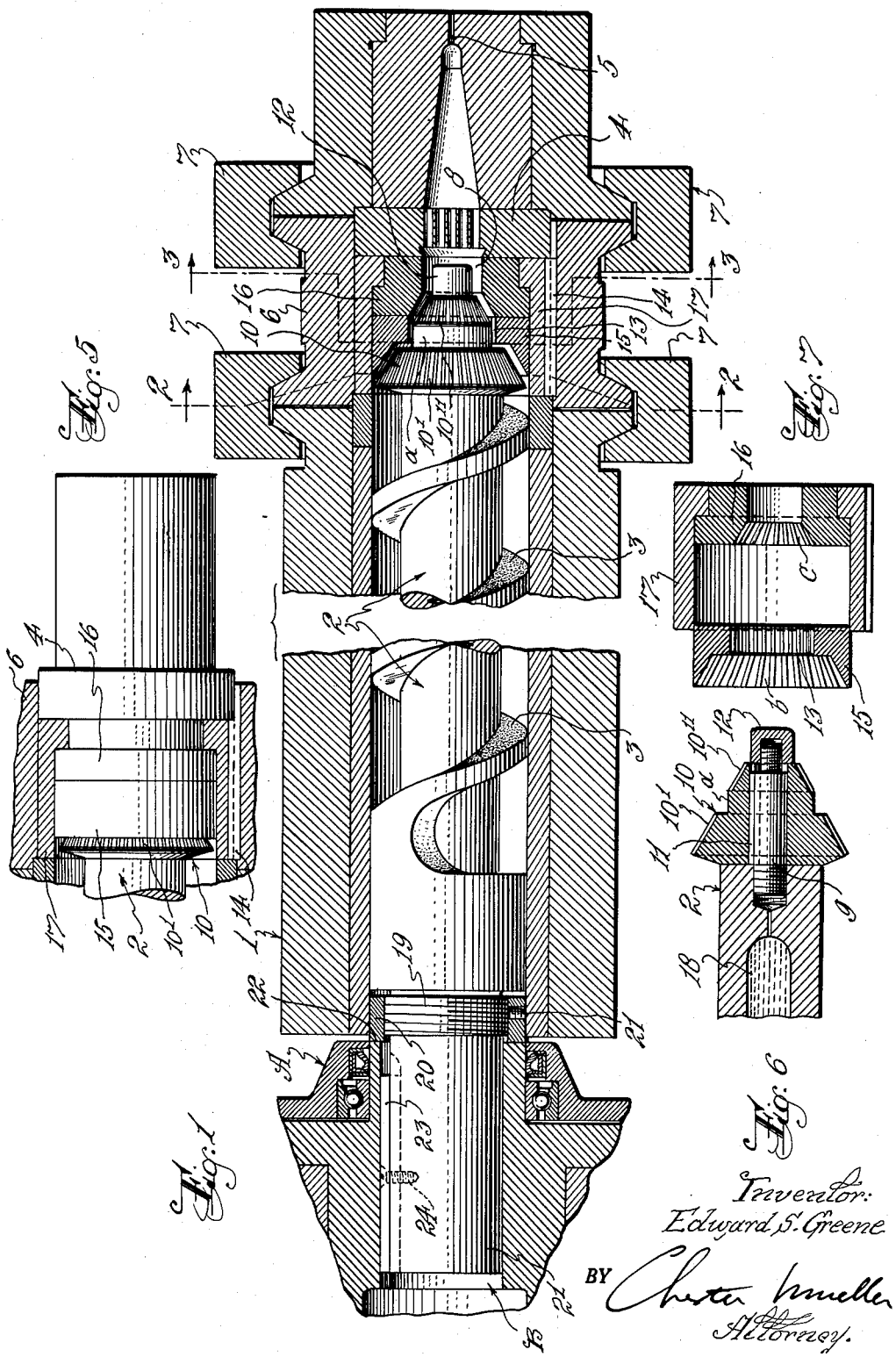
Inventor:
Edward S. Greene
BY Chester Mueller
Attorney.

Jan. 31, 1956  E. S. GREENE  2,732,587
MASTICATING HEAD FOR AN EXTRUSION MACHINE
Filed March 23, 1953  2 Sheets-Sheet 2
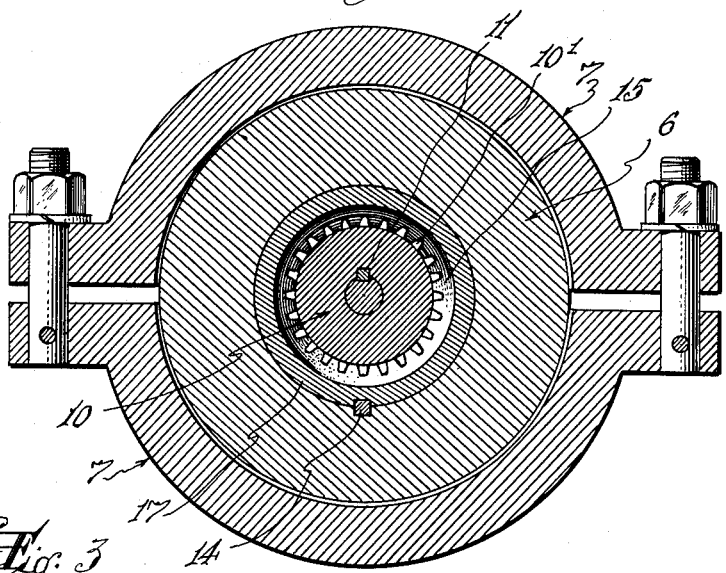
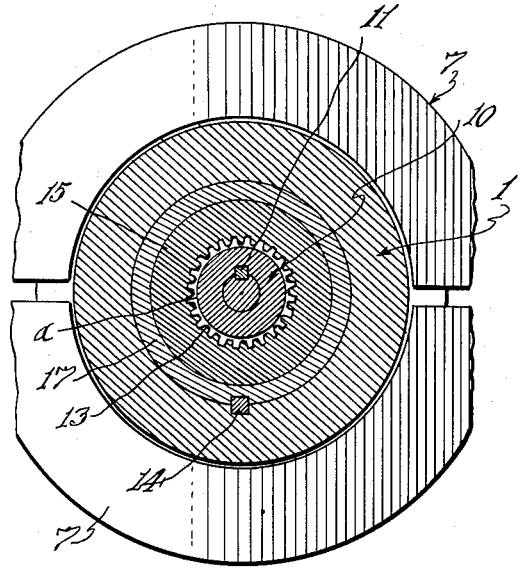
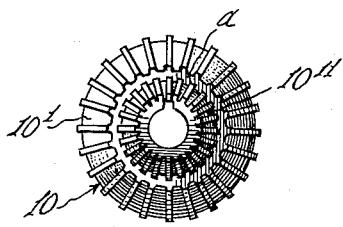
Inventor:
Edward S. Greene
BY Chester Mueller
Attorney.

United States Patent Office 2,732,587
Patented Jan. 31, 1956

2,732,587

MASTICATING HEAD FOR AN EXTRUSION MACHINE

Edward S. Greene, Union, N. J.

Application March 23, 1953, Serial No. 343,846

4 Claims. (Cl. 18—12)

This invention relates to a masticating head for a plastic extrusion machine and the means for adjusting the space between the moving and stationary parts in such head.

It is the object of this invention to provide a masticating head that will thoroughly masticate and work plastic material fed through the barrel of an extrusion machine, or extruder as it is referred to in the trade, with means for adjusting the space between opposing surfaces that masticate the material. Another object is to provide means for not only readily adjusting the surfaces between which the chewing action takes place, but for facilitating the use of different types of masticating surfaces in such a head. Still another object is to permit such a masticating head to be conveniently adapted to existing extruders or to be easily incorporated in new ones. Other objects will be apparent from the description contained herein.

Heretofore extruders have employed various means for mixing plastic material passed through them under pressure. The most frequently applied means are found in the shape of the feeder threads or flights that feed the plastic material through the barrel of the extruder. In my co-pending application for a patent for a masticating head, Serial No. 326,683, filed December 18, 1952, now abandoned and in several other applications filed since that date, I have pointed out that I find a chewing or masticating under pressure more effectively compounds a plastic material than merely a twisting or kneading operation. In other applications I have described various extruder improvements for securing the desired chewing and masticating results. In this application I describe still another improvement in the masticating head.

My invention is illustrated in the accompanying drawings in which the same reference character refers to the same or a similar part. The figures illustrate only such portions of a conventional extruder as is necessary for a full understanding of this invention.

Figure 1 is a side elevational view of each end of the barrel of an extruder showing in longitudinal section the end of the feeder drive shaft, the barrel ends and the masticating head, and in whole the enclosed feeder ends.

Figure 2 is a cross section taken along the line 2—2 of Figure 1.

Figure 3 is a cross section taken along the line 3—3 of Figure 1.

Figure 4 is an end view of the feeder extension only as seen from the orifice end of the extruder.

Figure 5 is a side elevational view of the interior of the masticating head immediately surrounding the feeder extension showing its relation to the barrel extension.

Figure 6 is a longitudinal section in elevation showing the attachment of the feeder extension to the feeder.

Figure 7 is a longitudinal section in elevation of the pieces, in the course of assembly, that form the chamber in which the feeder extension of Figure 6 rotates.

Referring to Figure 1, there are shown certain conventional parts of an extruder barrel assembly, namely, barrel 1, feeder 2, on which flights 3 are mounted, screen 4 and orifice 5. Also shown are a portion of the conventional parts of an extruder feeder drive shaft assembly, namely, bore B and thrust bearing A. Feeder 2 is coupled by its shank 2' to the drive shaft, within bore B, by key and keyway 23 and set screw 24.

Shank 2' is provided with threads 19 to accommodate adjusting nut 20, which by set screw 21 may be secured thereto.

This adjusting nut 20 bears on shoulder 22 of thrust bearing A which carries the thrust developed when plastic material is forced through barrel 1 by feeder 2.

At the other end of feeder 2 it is provided with feeder extension 10 of substantially conical shape. As shown in Figures 2, 3 and 6 feeder extension 10 is mounted on shaft 9 which is screwed into feeder 2. Feeder extension 10 is keyed to shaft 9 by key and keyway 11 and retained in place by cap screw 12. Shown also in Figure 6 is a portion of coolant cavity 18 in feeder 2, a conventional element of most extruders.

Feeder extension 10 is characterized by a plain cylindrical surface $a$ between ribbed conical surfaces 10' and 10" as best shown in Figure 4.

Between orifice 5 and the end of barrel 1, barrel extension 6 is removably secured by clamps 7 which are illustrated in Figures 1, 2, and 3. To the inner wall of barrel extension 6 there is keyed sleeve 17 by means of key and keyway 14. Within sleeve 17 there is assembled toothed ring 15 and ring 16 to form chamber 8 within barrel extension 6.

Figures 6 and 7 show the relationship of these parts before assembly into their final positions shown in Figure 1. When completely assembled, conical surface $b$ of toothed ring 15 is opposite ribbed surface 10', and conical surface $c$ of ring 16 is opposite ribbed surface 10". Teeth 13 are opposing cylindrical surface $a$.

The use of the masticating head shown is as follows. Adjustment is made of the adjusting nut 20 to secure the desired spacing between the surfaces of feeder extension 10 and the surfaces of rings 15 and 16 which wall chamber 8. Plastic material is introduced into a feed hopper, not shown, which admits the material into barrel 1. Feeder 2 passes the material into chamber 8 of barrel extension 6 where it is masticated between the opposing surfaces therein. From chamber 8 is passes through screen 4 and thence out through orifice 5.

The construction shown is but one form my invention may take. The embodiment here shown is in considerable detail to illustrate the readiness with which various substitutions of parts may be made. For example, surfaces $a$, $b$, and $c$ or any combination of them may be ribbed, serrated or toothed to add to the masticating effort. Various kinds of roughened, pointed or contoured surfaces may be used solely or in combination. Cylindrical surface $a$ and projecting ring of teeth 13 may be omitted and both feeder extension 10 and the wall of chamber 8 may be entirely conical in shape.

Means other than shown for varying the spacing between the fixed and moveable surfaces in the masticating head may be used. Instead of an adjusting feature at the base of the feeder, means may be used at the other end such as interposing thin or spacer rings between the end of feeder 2 and feeder extension 10. Other modifications readily manifest themselves.

In view of the foregoing it is not intended by the description and illustrations herein given to limit the scope of this invention.

What I claim is:

1. An extrusion machine comprising a cylinder; an adjustable length screw feeder in said cylinder so that said feeder is adapted to convey plastic material and discharge it from the cylinder under pressure; a chamber of conical shape removably secured to the discharge end of such cylinder; an internal toothed ring on the inner wall of such chamber and projecting outward therefrom; serrations on the inner wall of such chamber on both sides of the ring of teeth; a coaxial conical shaped extension of said feeder rotatable within the chamber; a recess in the surface of the extension adapted to accommodate the teeth of said ring in close proximity thereto; and serrations in the surface of the extension on both sides of said recess.

2. An extrusion machine comprising a cylinder; an adjustable length screw feeder in said cylinder so that said feeder is adapted to convey plastic material and discharge it from the cylinder under pressure; a chamber of conical shape removably secured to the discharge end of such cylinder; an internal toothed ring on the inner wall of such chamber and projecting outward therefrom; a coaxial conical shaped extension of said feeder rotatable within the chamber; a recess in the surface of the extension adapted to accommodate the teeth of said ring in close proximity thereto; and serrations in the surface of the extension on both sides of said recess.

3. An extrusion machine comprising a cylinder; an adjustable length screw feeder in said cylinder so that said feeder is adapted to convey plastic material and discharge it from the cylinder under pressure; a chamber of conical shape removably secured to the discharge end of such cylinder; an internal toothed ring on the inner wall of such chamber projecting outward therefrom with the ends of the teeth lying in a cylindrical plane; serrations on the inner wall of such chamber on both sides of the ring of teeth; a coaxial conical shaped extension of said feeder rotatable within the chamber; a recess in the surface of the extension adapted to accommodate the teeth of said ring in close proximity thereto; and serrations in the surface of the extension on both sides of said recess.

4. An extrusion machine comprising a cylinder; an adjustable length screw feeder in said cylinder so that said feeder is adapted to convey plastic material and discharge it from the cylinder under pressure; a chamber of conical shape removably secured to the discharge end of such cylinder; an internal toothed ring on the inner wall of such chamber projecting outward therefrom with the ends of the teeth lying in a cylindrical plane; serrations on the inner wall of such chamber on both sides of the ring of teeth; a coaxial conical shaped extension removably secured to said feeder and rotatable within the chamber; a recess in the surface of the extension adapted to accommodate the teeth of said ring in close proximity thereto; and serrations in the surface of the extension on both sides of said recess.

References Cited in the file of this patent

UNITED STATES PATENTS

| | | |
|---|---|---|
| 388,940 | Williams | Sept. 4, 1888 |
| 1,516,843 | Buttfield | May 3, 1922 |
| 1,935,050 | Gordon | Nov. 14, 1933 |